(12) United States Patent
Bramson

(10) Patent No.: US 7,072,560 B1
(45) Date of Patent: Jul. 4, 2006

(54) TWIST FREE METHOD OF OPTICAL FIBER STOWAGE AND PAYOUT

(75) Inventor: Michael D. Bramson, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/078,941

(22) Filed: Mar. 10, 2005

(51) Int. Cl.
*G02B 6/00* (2006.01)

(52) U.S. Cl. ...................................... 385/135; 385/134
(58) Field of Classification Search ......... 385/134–135
See application file for complete search history.

(56) References Cited

U.S. PATENT DOCUMENTS

| | | | | |
|---|---|---|---|---|
| 2,677,510 A | * | 5/1954 | Osborne | 242/405.2 |
| 4,687,154 A | * | 8/1987 | Deweese | 242/405.2 |
| 5,193,756 A | * | 3/1993 | Chesler | 242/593 |
| 5,657,412 A | * | 8/1997 | Caudrelier | 385/135 |
| 5,979,812 A | * | 11/1999 | Kotzur et al. | 242/163 |
| 6,702,213 B1 | * | 3/2004 | Kotzur et al. | 242/163 |
| 2003/0029956 A1 | * | 2/2003 | Pohl | 242/386 |

* cited by examiner

*Primary Examiner*—John D. Lee
(74) *Attorney, Agent, or Firm*—Charlene A. Haley; David S. Kalmbaugh

(57) ABSTRACT

An apparatus and method for stowage of flexible linear objects including optical fibers, hoses, ropes, and electrical wires/cables. The apparatus includes spreader structures dimensioned and configured to stow objects in a figure 8 configuration to reduce potential factures sites, snagging, or kinking of these items during winding and/or unwinding.

5 Claims, 2 Drawing Sheets

TWIST FREE METHOD OF OPTICAL FIBER STOWAGE AND PAYOUT

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The present invention relates to an apparatus and method for stowage of flexible linear objects including optical fibers, hoses, ropes, electrical wires, electrical cables, and the like, and more specifically, apparatuses and methods including spreader structures dimensioned and configured to stow objects in a figure 8 configuration to reduce potential factures sites, snagging, or kinking of these objects during winding and/or unwinding.

BACKGROUND OF THE INVENTION

Stowed fiber is traditionally stowed in loops. In military applications, weapons related optical and electro-optical devices pigtailed with optical fiber are spliced together and there is excess fiber that is not stowed due to the working length requirement of certain splicing operations. To then stow this excess fiber without twisting it, one device is mounted while the other device together with its stowed fiber must be physically rotated in a spiral fashion to coil up the fiber at the splice. This is exactly backwards from what would be mechanically advantageous namely, fixing both devices and working with just the fiber.

Paying out fiber passively (unmotorized) has traditionally been accomplished by spooling the fiber on a cylindrical form. Then when needed, the fiber is pulled axially off the form. This produces a spiral of fiber as it is pulled off. As the fiber is pulled more and more taught, this induces regions of high stress, kinks in other words. These kinks are all potential fracture sites.

There exists a need in the art for an apparatus and method of stowage for flexible linear objects including optical fiber which reduces regions of high stress and provides a substantially kink free environment when paying out fiber passively. An ideal apparatus and method of optical fiber stowage would not induce 360° twists in the fiber and allow both ends of the fiber to be fixed.

It is to be understood that the foregoing general description and the following detailed description are exemplary and explanatory only and are not to be viewed as being restrictive of the present invention, as claimed. Further advantages of this invention will be apparent after a review of the following detailed description of the disclosed embodiments, which are illustrated schematically in the accompanying drawings and in the appended claims.

DETAILED DESCRIPTION OF THE INVENTION

Figure 1:
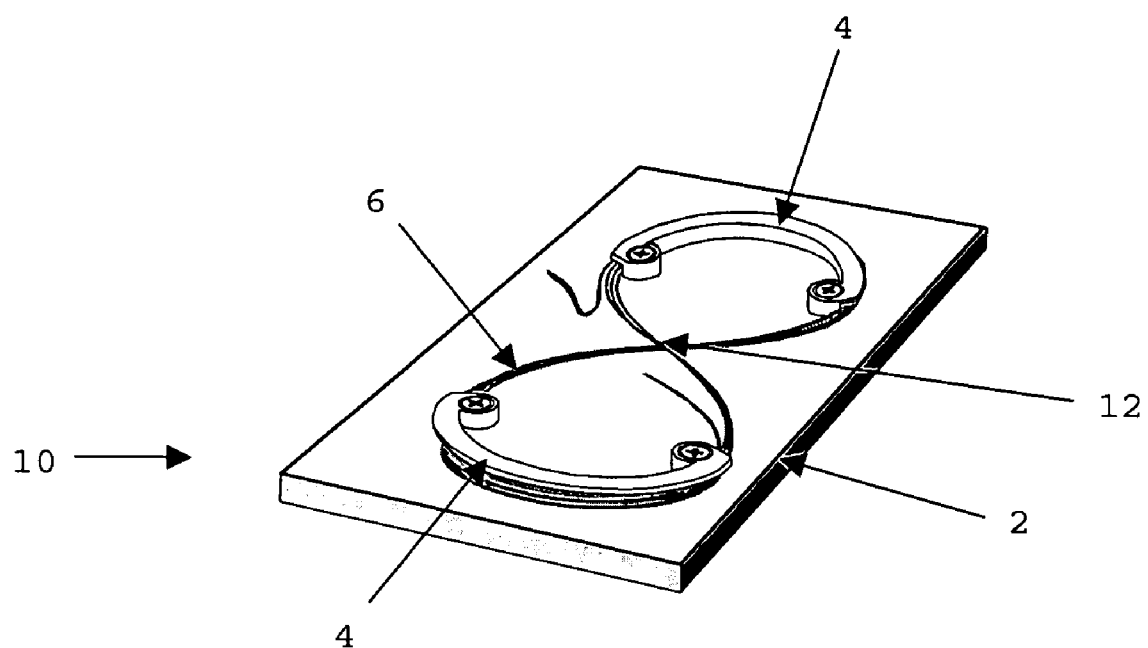
FIG. 1 is a perspective view of another embodiment of the present invention for optical fiber stowage showing crescent shaped spreader structures dimensioned and configured to promote winding and unwinding of optical fiber in a figure 8 configuration, according to the present invention.
Figure 2:
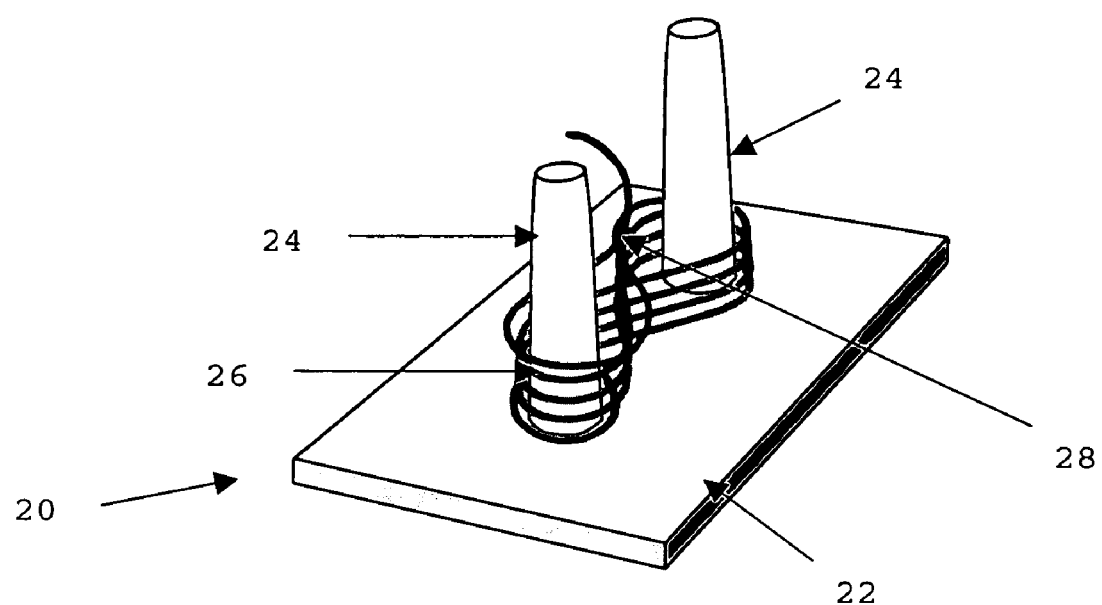
FIG. 2 is a perspective view of an embodiment of the present invention for optical fiber stowage showing tapered spreader structures dimensioned and configured to promote winding and unwinding of optical fiber in a figure 8 configuration, according to the present invention.

The present invention relates to apparatuses and methods for stowage of items including optical fiber, electrical wire/cable, and hose/rope. An aspect of the present invention as shown in FIG. 1 includes an apparatus 10 for stowage, comprising a base 2 and a plurality of spreader structures 4 dimensioned and configured to store optical fiber 6 in a figure 8 configuration having a center 12; and the plurality of spreader structures are dimensioned and configured to permit a desired amount of optical fiber to be wound and unwound onto to the plurality of spreader structures to promote a substantially net zero twist of optical fiber, wherein the structures promote figure 8 winding and unwinding of optical fiber, wherein one revolution is defined by the optical fiber being wound or unwound into one completed figure 8, wherein one-half of the revolution of the figure 8 configuration produces a one-half twist of the optical fiber and wherein the other half of the revolution of the figure 8 configuration produces an opposite one half twist of the optical fiber, and wherein the optical fiber being unwound axially from the figure 8 configuration reduces potential fracture sites or kinking of the optical fiber.

Another embodiment of the present invention includes an apparatus 20 for stowage, comprising: a base 22 and a plurality of spreader structures 24 dimensioned and configured to store a flexible linear object being a hose/rope 26 in a figure 8 configuration having a center 28; and the plurality of spreader structures dimensioned and configured to permit a desired amount of hose/rope to be wound and unwound onto to the plurality of spreader structures to promote a substantially net zero twist of the hose/rope, wherein the structures promote a figure 8 winding and unwinding of the hose/rope, wherein one revolution is defined by the hose/rope being wound or unwound into one completed figure 8, wherein one-half of the revolution in the figure 8 configuration produces a one-half twist of the hose/rope and wherein the other half of the revolution in the figure 8 configuration produces an opposite one half twist of the hose/rope, and wherein the hose/rope being unwound axially from the figure 8 configuration reduces potential kinking of the hose/rope.

In a further embodiment, the present invention includes an apparatus 20 for stowage, comprising: a base 22 and a plurality of spreader structures 24 dimensioned and configured to store a flexible linear object being an electrical wire/cable 26 in a figure 8 configuration having a center 28; and the plurality of spreader structures dimensioned and configured to permit a desired amount of the electrical wire/cable to be wound and unwound onto to the plurality of spreader structures to promote a substantially net zero twist of the electrical wire/cable, wherein the spreader structures promote the figure 8 winding and unwinding of the electrical wire/cable, wherein one revolution is defined by the electrical wire/cable being wound or unwound into one completed figure 8 configuration, wherein one-half of the revolution in the figure 8 configuration produces a one-half twist of the electrical wire/cable and wherein the other half of the revolution in the figure 8 configuration produces an opposite one half twist of the electrical wire/cable, and wherein the electrical wire/cable being unwound axially from the figure 8 configuration reducing potential fracture sites or kinking of the electrical wire/cable.

In this apparatus embodiment, the spreader structures of the present invention are tapered to reduce or eliminate the possibility of snagging optical fiber when optical fiber is unwound axially from the structures. In other embodiments, the spreader structures are crescent shaped tongs, which function to form and support the optical fiber. Furthermore, the figure 8 configuration permits fixing spliced components and to wind up excess optical fiber without twisting of the optical fiber.

Another embodiment of the present invention includes a method for stowage, comprising: providing a flexible linear object being a hose/rope for winding, the winding being wound with the hose/rope of predetermined lengths; providing a device having a base and a plurality of spreader structures dimensioned and configured to store the hose/rope being wound and unwound in an figure 8 configuration having a center; and winding a desired length of the hose/rope onto the plurality of spreader structures arranged on the base to promote axially spooling of the hose/rope, wherein the winding of the hose/rope produces the figure 8 creating a one-half twist of the hose/rope in said figure 8 and producing an opposite one-half twist of said hose/rope in the figure 8 configuration equaling one complete revolution, creating a net zero twist of the hose/rope being wound in each complete revolution, wherein creating the net zero twist reduces kinking of the hose/rope when unwound axially.

In further embodiments, the present invention includes a method for stowage, comprising: providing flexible linear object being an electrical wire/cable for winding, the winding being wound with the electrical wire/cable of predetermined lengths; providing a device having a base and a plurality of spreader structures dimensioned and configured to store the electrical wire/cable being wound and unwound in an figure 8 configuration having a center; and winding a desired length of the electrical wire/cable onto the plurality of spreader structures arranged on the base to promote axially spooling of the electrical wire/cable, wherein the winding of the electrical wire/cable produces a figure 8 creating a one-half twist of the electrical wire/cable in the figure 8 configuration and producing an opposite one-half twist of the electrical wire/cable in the figure 8 configuration equaling one complete revolution, creating a net zero twist of the electrical wire/cable being wound in each complete revolution, wherein creating the net zero twist reduces kinking of the electrical wire/cable when unwound axially.

In this method embodiment, the spreader structures are crescent shaped tongs, which function to form and support the optical fiber. In other embodiments, the spreader structures are tapered to reduce or eliminate the possibility of snagging optical fiber when optical fiber is stored, wound, and unwound onto the structures. The figure 8 configuration is dimensioned and configured to permit axially spooling of optical fiber and paying out said optical fiber passively producing an untwisted liner optical fiber without the possibility of snagging or kinking said optical fiber. The figure 8 configuration also permits fixing spliced components and to wind up excess optical fiber without twisting of the optical fiber. The figure 8 configuration further permits unwinding of the optical fiber producing an untwisted linear optical fiber while being pulled off the figure 8 spool axially. In addition, the figure 8 winding being used to stow optical fiber between spliced components. After the winding of optical fiber is completed, the ends of the optical fiber are bound at the center of the figure 8 configuration.

The size of the spreader structures and figure 8 configuration is adaptable to fit any application including, but not limited to, examples of heavy electrical wire and cable installed on telephone and power-lines to smaller applications including fibers or wires utilized in nano-electronics. The present invention could be motorized permitting electrical winding and unwinding of flexible linear objects. The spreader structures and base can be made of any type of materials including, but not limited to, plastics, woods, metals, cements, and the like, each depending on the nature of the application and the flexible linear objects being utilized. In another embodiment of the present invention the spreader structures are removable/detachable or can be adjusted to loosen the tension of the wind.

Major advantages of the present invention include, but are not limited to, fiber stowage between spliced components, fiber stowage and pay-out from a missile to form a secure data link with the launch platform, garden hose stowage and payout, fire hose stowage and payout, in-ground or overhead cable stowage and payout, non-rotation sensitive sensing coil wind for the Sagnac Interferometer.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An apparatus for stowage, comprising:
a base and a pair of spreader structures dimensioned and configured to store optical fiber in a figure 8 configuration having a center, wherein said apparatus allows for fixing spliced components and winding up excess optical fiber without twisting of said optical fiber;
said pair of spreader structures dimensioned and configured to permit a desired amount of said optical fiber to be wound and unwound onto said pair of spreader structures to promote a substantially net zero twist of said optical fiber, wherein said spreader structures promote said figure 8 winding and unwinding of said optical fiber, wherein one revolution is defined by said optical fiber being wound or unwound into one completed figure 8, wherein one-half of said revolution of said figure 8 configuration produces a one-half twist of said optical fiber and wherein the other half of said revolution of said figure 8 configuration produces an opposite one half twist of said optical fiber, and wherein said optical fiber being unwound axially from said figure 8 configuration reduces potential fracture sites or kinking of said optical fiber; and
each of said pair of spreader structures being tapered inward from a base for said spreader structure to an upper end for said spreader structure to approximate a truncated cone which eliminates the possibility of snagging said optical fiber when said optical fiber is unwound axially from said pair of spreader structures.

2. The apparatus according to claim 1 wherein said figure 8 configuration is dimensioned and configured to permit axially spooling of optical fiber and paying out said optical fiber passively in a piecemeal manner producing an untwisted linear optical fiber without the possibility of snagging or kinking said optical fiber.

3. A method for optical fiber stowage, comprising:
providing optical fiber for winding, said winding being wound with said optical fiber of predetermined lengths;

providing a device having a base and a pair of spreader structures dimensioned and configured to store said optical fiber being wound and unwound in a figure 8 configuration having a center, said method permitting fixing spliced components and winding up excess optical fiber without twisting of said optical fiber, wherein each of said pair of spreader structures is tapered inward from a base for said spreader structure to an upper end for said spreader structure to approximate a truncated cone which eliminates the possibility of snagging said optical fiber when said optical fiber is unwound axially from said pair of spreader structures; and winding a desired length of said optical fiber onto said pair of spreader structures arranged on said base to promote axially spooling of said optical fiber, wherein said winding of said optical fibers produces said figure 8 creating a one-half twist of said optical fiber in said figure 8 configuration and producing an opposite one-half twist of said optical fiber in said figure 8 configuration equaling one complete revolution, creating a net zero twist of said optical fiber being wound in each said complete revolution, wherein creating said net zero twist reduces potential fracture sites in said optical fiber.

4. The method according to claim 3, wherein said figure 8 configuration is dimensioned and configured to permit axially spooling of optical fiber and paying out said optical fiber passively in a piecemeal manner producing an untwisted linear optical fiber without the possibility of snagging or kinking said optical fiber.

5. The method according to claim 3, wherein said figure 8 winding is used to stow optical fiber between spliced components.

* * * * *